US010020668B2

(12) United States Patent
Adamisin (10) Patent No.: US 10,020,668 B2
(45) Date of Patent: Jul. 10, 2018

(54) CHARGING APPARATUS FOR WEARABLE ELECTRONIC DEVICE

(71) Applicant: Apple Inc., Cupertino, CA (US)

(72) Inventor: Gregory S. Adamisin, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 232 days.

(21) Appl. No.: 14/809,518

(22) Filed: Jul. 27, 2015

(65) Prior Publication Data

US 2017/0033567 A1 Feb. 2, 2017

(51) Int. Cl.
  *G04G 19/00* (2006.01)
  *H02J 5/00* (2016.01)
  *H02J 7/02* (2016.01)
  *H02J 50/90* (2016.01)
  *H02J 50/80* (2016.01)
  *H02J 7/00* (2006.01)

(52) U.S. Cl.
  CPC .............. *H02J 7/025* (2013.01); *G04G 19/00* (2013.01); *H02J 5/005* (2013.01); *H02J 7/0042* (2013.01); *H02J 50/80* (2016.02); *H02J 50/90* (2016.02)

(58) Field of Classification Search
  CPC ........ G04G 17/06; G04G 19/00; G06F 1/163; H01F 38/14; H02J 5/005; H02J 7/0042; H02J 7/025; H02J 17/00; H02J 50/10; H02J 50/12; H02J 50/80; H02J 50/90; H04B 5/0037; H04B 5/0075; H04B 5/0093
  USPC ..................................... 307/104; 361/679.03
  See application file for complete search history.

(56) References Cited

U.S. PATENT DOCUMENTS

| 9,583,256 B2* | 2/2017 | Lapetina ............... H01F 27/365 |
| 2008/0204181 A1* | 8/2008 | Tolle ........................ H01F 38/14 336/110 |
| 2013/0197607 A1* | 8/2013 | Wilder ................. A61N 1/3787 607/59 |

(Continued)

FOREIGN PATENT DOCUMENTS

WO WO2007/077284 7/2007

OTHER PUBLICATIONS

Giannulli, Tom, "WiPowerBand Extends the Apple Watch Battery Life," http://www.prnewswire.com/news-releases/wipowerband-extends-the-apple-watch-battery-life-300064341.html, 2 pages, May 1, 2015.

(Continued)

*Primary Examiner* — Levi Gannon
(74) *Attorney, Agent, or Firm* — Kilpatrick Townsend & Stockton LLP (57) ABSTRACT

A wearable power apparatus for a wearable electronic device includes one or more conductors, one or more batteries connected to the conductor, and/or an inductive coil that attaches to the wearable electronic device to inductively transmit power from the battery to the wearable electronic device, such as while the wearable electronic device is worn. The power apparatus may have attachment mechanisms that attach to a band coupled to the wearable electronic device. Alternatively or additionally, the power apparatus may be at least partially embedded within the band. The inductive coil may also receive power for the battery from another inductive coil. The battery may include one or more connectors that power to (and/or receiving power from) one or more other electronic devices.

19 Claims, 8 Drawing Sheets

(56) References Cited

U.S. PATENT DOCUMENTS

| | | | |
|---|---|---|---|
| 2014/0084860 A1* | 3/2014 | Jaax | H02J 7/025 |
| | | | 320/108 |
| 2014/0375246 A1* | 12/2014 | Boysen, III | H02J 5/005 |
| | | | 320/101 |
| 2015/0016035 A1 | 1/2015 | Tussy | |
| 2015/0130411 A1* | 5/2015 | Kim | G04C 10/00 |
| | | | 320/108 |
| 2015/0195009 A1* | 7/2015 | Wang | H04B 5/0037 |
| | | | 455/573 |
| 2016/0062319 A1* | 3/2016 | Kim | G04C 10/00 |
| | | | 368/204 |
| 2016/0172890 A1* | 6/2016 | Jeong | H02J 7/04 |
| | | | 320/108 |
| 2016/0266606 A1* | 9/2016 | Ricci | G06F 1/163 |
| 2016/0276862 A1* | 9/2016 | Herrmann | H02J 7/025 |
| 2016/0291550 A1* | 10/2016 | Chen | H02J 50/10 |
| 2017/0006414 A1* | 1/2017 | Tomassini | H04B 5/0037 |

OTHER PUBLICATIONS

Etherington, Darrell, "Nomad's Pod is a Clever Portable Backup Battery for Apple Watch," http://techcrunch.com/2015/03/17/nomads-pod-is-a-clever-portable-backup-battery-for-apple-watch/, 7 pages, Mar. 17, 2015.

* cited by examiner

CHARGING APPARATUS FOR WEARABLE ELECTRONIC DEVICE

FIELD

The described embodiments relate generally to power. More particularly, the present embodiments relate to a wearable power apparatus for a wearable electronic device.

BACKGROUND

Electronic devices may be capable of performing a wide variety of different functions. One element that various electronic devices may have in common is a power source, which provides power to perform respective functions. Some electronic devices may utilize power from a wired power source, such as an electrical outlet. Instead of (or in addition to) a wall outlet or other wired power source, many electronic devices may utilize power from a portable power source, such as a battery.

For electronic devices that utilize one or more batteries for power, battery capacity may significantly affect the capabilities of the electronic device. Electronic devices may not be capable of performing any functions without power, and some functions may be more energy intensive than others. Regardless, the higher the capacity of the battery the longer the electronic device can be used at a time, making the electronic device more useful. This may particularly be the case for highly portable devices such as tablet computers, smart phones, or wearable electronic devices where acceptable battery size and weight may be limited, thus also possibly limiting battery capacity.

SUMMARY

The present disclosure relates to wearable power apparatuses for wearable electronic devices. A wearable power apparatus for a wearable electronic device may include one or more conductors, one or more batteries connected to the conductor, and/or an inductive coil that attaches to the wearable electronic device to inductively transmit power from the battery to the wearable electronic device, such as while the wearable electronic device is worn. As the power apparatus is wearable, a user may use the power apparatus without removing (and/or while using) the wearable electronic device. The power apparatus may have attachment mechanisms or attachment components that attach to a band coupled to the wearable electronic device. Alternatively or additionally, the power apparatus may be at least partially embedded within the band. The inductive coil may also receive power for the battery from another inductive coil. The battery may include one or more connectors that provide power to (and/or receiving power from) one or more other electronic devices.

In various embodiments, a wearable external power apparatus for a wearable electronic device may include a housing including a magnet that magnetically attracts the housing to the wearable electronic device, an inductive coil disposed within the housing, a conductor electrically connected to the inductive coil, a battery electrically connected to the conductor and an attachment mechanism that attaches to the wearable electronic device or a band coupled to the wearable electronic device. The inductive coil may inductively transmit power from the battery to the wearable electronic device while the wearable external power apparatus is worn.

In some examples, the attachment mechanism may be a clip that clips to the band. In various examples, the attachment mechanism may attach to an inner surface of the band.

In various examples, the conductor may be biased toward a straight, unbent position. The conductor may be biased toward the band when the attachment mechanism is attached.

In some examples, the wearable external power apparatus may further include a connector coupled to the battery, the connector configured to charge the battery. The battery may provide power to an electronic device via the connector.

In various examples, the housing may define an aperture aligned with a sensor window of the wearable electronic device when the housing magnetically attaches to the wearable electronic device.

In some embodiments, a wearable electronic device may include a body including a first inductive coil, a band that couples the body to a wearer, a conductor embedded at least partially within the band, a battery embedded at least partially within the band and electrically connected to the conductor, and a second inductive coil, electrically connected to the conductor and magnetically attachable to the body. The second inductive coil inductively transmits power from the battery to the first inductive coil.

In some examples, the second inductive coil may draw power from the battery through the conductor. In various examples, the battery and/or the conductor may be flexible and/or curved to conform to a curvature of the band. In some examples, the wearable electronic device may further include a power connector coupled to the battery and at least partially concealed within the band while the wearable power apparatus is worn.

In various embodiments, a wearable power apparatus may include a storage component, an attachment component operable to couple the storage component to a band of a wearable electronic device, a power transfer component, and circuitry, connected to the power transfer component. The power transfer component may be operative to magnetically attach to a wearable electronic device and inductively transmit power drawn from the storage component to the wearable electronic device while the wearable external power apparatus and wearable electronic device are worn. The circuitry may be operative to determine when the wearable external power apparatus and wearable electronic device are worn.

In some examples, the attachment component may be operable to couple the storage component to the band such that the band at least partly obscures the power storage component from view while the wearable external power apparatus and wearable electronic device are worn.

In various examples, the circuitry may be operable to control the power transfer component. The circuitry may control the power transfer component to regulate inductive transmission of power to control temperature increases when the wearable electronic device is worn. The circuitry may control the power transfer component to regulate inductive transmission of power differently when the wearable electronic device is worn than when the wearable electronic device is unworn.

In some examples, the wearable power apparatus may be operable to exchange data between the wearable electronic device and another electronic device.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The present disclosure relates to power apparatuses for wearable electronic devices. A wearable power apparatus for a wearable electronic device may include an inductive coil attaches to the wearable electronic device and/or one or more batteries coupled to the inductive coil by one or more conductors. The inductive coil may inductively transmit power from the battery to the wearable electronic device. The power apparatus may provide power to the wearable electronic device while the wearable electronic device is worn. As the power apparatus is wearable, a user may use the power apparatus without removing (and/or while using) the wearable electronic device.

The power apparatus may have attachment mechanisms or attachment components that attach to a band (or other attachment member) coupled to the wearable electronic device. Alternatively or additionally, the power apparatus may be at least partially embedded within the band. The inductive coil may also receive power for the battery from another inductive coil. The battery may include one or more connectors that provide power to (and/or receive power from) one or more other electronic devices.

These and other embodiments are discussed below with reference to FIGS. 1-11. However, those skilled in the art will readily appreciate that the detailed description given herein with respect to these Figures is for explanatory purposes only and should not be construed as limiting.

Figure 1:
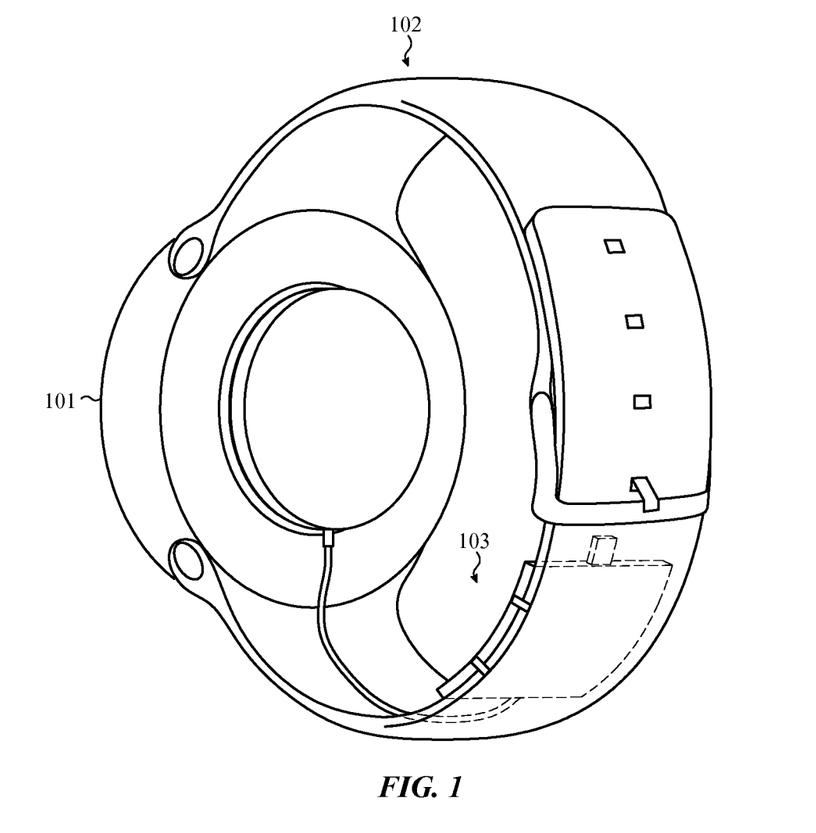
FIG. 1 depicts a wearable electronic device having an external power apparatus coupled to the device's band.
Figure 2:
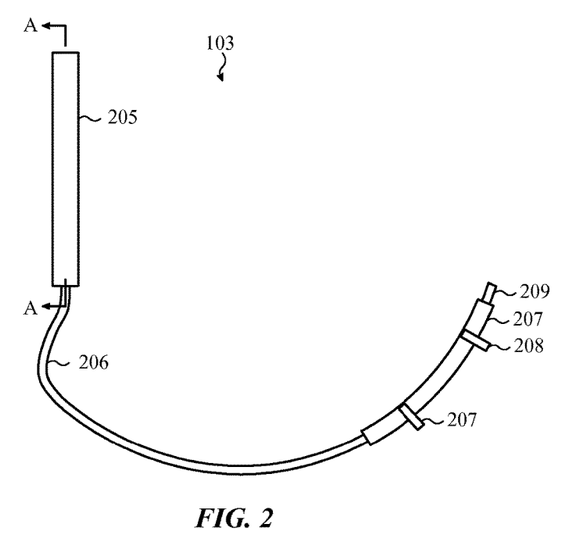
FIG. 2 depicts the external power apparatus of FIG. 1 separated from the wearable electronic device and band.

FIG. 1 depicts a wearable electronic device 101 with an external power apparatus 103 coupled to the a band 102 coupled to the wearable electronic device 101. FIG. 2 illustrates the external power apparatus 103 of FIG. 1 by itself, and FIG. 3 illustrates the wearable electronic device 101 alone.

Figure 3:
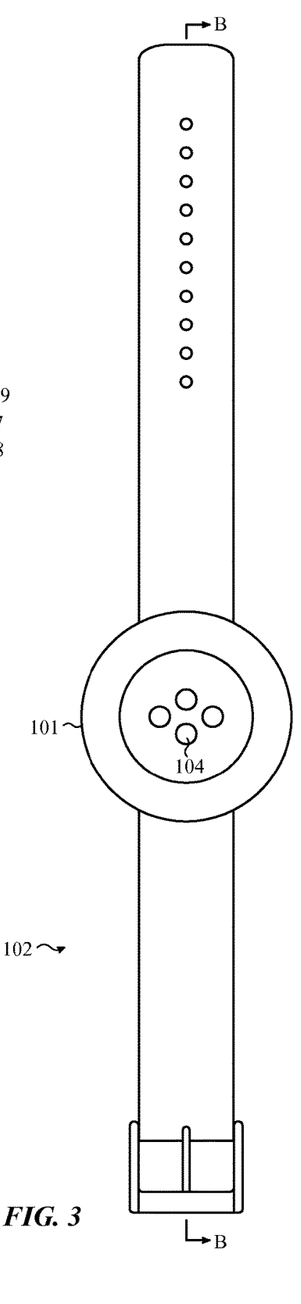
FIG. 3 depicts the wearable electronic device and band of FIG. 1 separated from the external power apparatus.

Referring to FIGS. 1-3, the external power apparatus 103 powers the wearable electronic device 101 while the wearable electronic device 101 is worn by a user. The external power apparatus 103 may include any or all of: a power transfer component 205 that couples (such as magnetically) to a surface of the wearable electronic device 101; one or more conductors 206 or conduits; and one or more batteries 207 or other storage components. The power transfer component 205 may be electrically connected to the conductor 206, which may be electrically connected to the battery 207. As such, the power transfer component 205 and the battery 207 may transmit power to each other via the conductor 206 (i.e., the power transfer component 205 may draw power from the battery 207 and/or the battery 207 may draw power from the power transfer component 205). When coupled to the surface, the power transfer component 205 inductively transmits power obtained from the battery 207 via the conductor 206 to the wearable electronic device 101.

For example, alternating current may be run through an inductive coil of the power transfer component 205. This may generate a magnetic field that magnetically couples the inductive coil of the power transfer component 205 and an inductive coil of the wearable electronic device 101. This magnetic field may induce a voltage in the inductive coil of the wearable electronic device 101, thus inductively transferring power from the power transfer component 205 to the wearable electronic device 101. The efficiency of the power transfer may depend on the coupling between the inductive coils, determined by the distance between the inductive coils, the alignment of the inductive coils, and the ratio between the diameters of the inductive coils. The lower the efficiency, the less power may be transferred and/or the more heat may be generated by the power transfer.

The conductor 206 may be conductive metal, a flex circuit, conductive elastomer, wires, and/or any other conductive structure. The conductor 206 may connect to the power transfer component 205 and/or the battery 207 via various kinds of interconnect such as solder, conductive adhesive, and so on. The conductor 206 may be flexible. The conductor 206 may also be shaped to conform to a curvature of the band 102. Further, the band 102 may have a curved surface that is adjacent to the conductor 206 and the surface of the conductor 206 facing the band 102 may be concavely shaped to conform to the curved surface of the band 102.

Similarly, the battery 207 may also be flexible and/or shaped to conform to a curvature of the band. Further, if the surface of the band 102 adjacent to the battery is curved, the surface of the battery 207 facing the band 102 may be concavely shaped to conform to the curved surface of the band 102.

Figure 4:
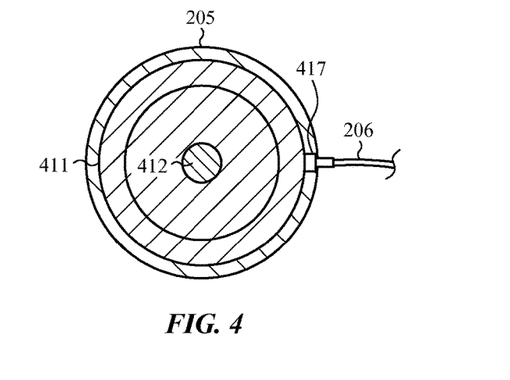
FIG. 4 depicts a cross-sectional view of the power transfer component of the external power apparatus of FIG. 2, taken along line A-A of FIG. 2.

FIG. 4 is a cross-sectional view of the power transfer component 205 of the external power apparatus 103 of FIG.

Figure 5:
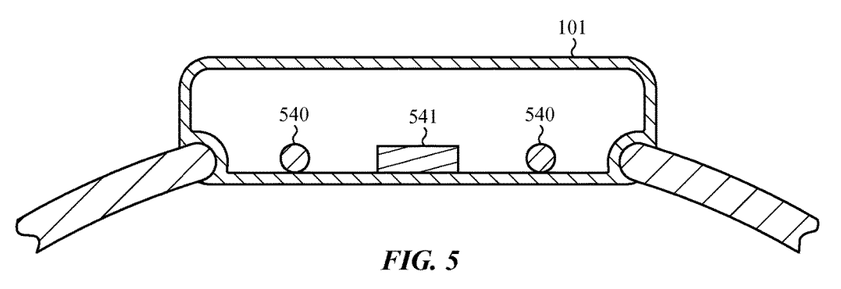
FIG. 5 is a cross-sectional view of the wearable electronic device 101 of FIG. 3, taken along line B-B of FIG. 3.

2, taken along line A-A of FIG. 2. FIG. 5 is a cross-sectional view of the wearable electronic device 101 of FIG. 3, taken along line B-B of FIG. 3.

With reference to both FIGS. 4 and 5, the power transfer component 205 includes one or more inductive coils 411, control circuitry 417, and one or more magnets 412 positioned within the housing of the power transfer component 205. Under the control of the control circuitry 417, the inductive coil 411 inductively transmits power to an inductive coil 540 of the wearable electronic device 101 in order to provide power from the battery 207 or other storage components to the wearable electronic device 101.

The magnet 412 magnetically attracts the power transfer component 205 to the wearable electronic device 101 (such as by magnetic attraction to one or more magnets 541 of the wearable electronic device 101) in order to magnetically couple the power transfer component 205 to the surface and align the inductive coil 411 with the inductive coil 540 of the wearable electronic device 101. Attachment of the power transfer component 205 and alignment of the inductive coil 411 maximize inductive power transfer efficiency. This is because the further inductive coils are from each other, and/or the further out of alignment the coils are, the lower the efficiency of inductive power transfer between the inductive coils. Attachment also prevents the distance between the coils from increasing during inductive transfer and prevents the inductive coils from moving out of alignment due to movement of the power transfer component 205 and/or the wearable electronic device 101.

With reference to FIGS. 1 and 2, the external power apparatus 103 may include one or more attachment mechanisms or attachment components that attach to the band 102. For example, the battery 207 may include one or more clips 208 or similar attachment mechanisms or attachment components (such as magnets, adhesives, Velcro™, and so on) that attach the battery 207 to an underside or inner surface of the band 102.

Attaching the battery 207 and/or the entire external power apparatus 103 to an underside or inner surface of the band 102 or the wearable electronic device 101 may be better than an exposed surface of the band 102 or the wearable electronic device 101 for a number of reasons. For the example, this may conceal and/or at least partially obscure the battery 207 and/or the entire external power apparatus 103 from view, cushion the battery 207 and/or the entire external power apparatus 103 from impacts using the band 102, protect the battery 207 from exposure to the environment, better secure the battery 207 as the band 102 may shield the battery 207 from contacting objects that may detach the attachment mechanisms or attachment components, and so on.

By way of another example, the conductor 206 may include various attachment mechanisms or attachment components configured to attach the conductor 206 to and/or otherwise position the conductor 206 on a surface of the band 102. As shown, the conductor 206 may be configured as an elastically resilient material that can flex/bend but is biased towards a straight, unbent position. As such, the conductor 206 may be bent to be positioned within the band 102. Further, the biasing force may keep the conductor 206 snug against the band 102 when the attachment mechanisms are attached. In other examples the conductor 206 may include various attachment mechanisms or attachment components, such as clips, magnets, and so on.

The band 102 may be formed of various conductive or non-conductive materials such as metal, plastic, elastomer, fluoroelastomer, leather, and so on. In implementations when the band 102 is formed of a conductive material, one or more insulating materials may be positioned between the conductor 206 and the band 102. Such insulating materials may be positioned on the conductor 206 and/or the band 102. For example, an insulating sheath may be disposed around the conductor 206. By way of another example, an insulating layer or coating may be disposed on the band 102.

The external power apparatus 103 may include one or more connectors that connect the external power apparatus 103 to one or more other power sources and/or electronic devices. For example, a connector 209 may be coupled to the battery 207 or other storage components. The connector 209 may be any kind of power and/or data or other connector such as a Lightning™ connector, a miniaturized Lightning™ connector, a universal serial bus (USB) connector, a mini USB connector, and so on. The connector 209 may be used to charge the battery 207 from a power source (such as one or more additional batteries, a wall outlet, another electronic device, and so on) and/or to provide power from the battery 207 to another electronic device (such as a laptop computing device, wearable electronic device, smart phone, tablet computing device, and so on). The connector 209 may also be used to connect the external power apparatus 103 to a power source; the power transfer component 205 may inductively transmit power from such a power source to the wearable device 101. In some implementations, the connector 209 may be concealed within the band or a clasp of the band, either while the wearable electronic device is worn (e.g., the band is clasped about a user's body part) or at all times.

The connector 209 is shown as a male connector (a projecting connector that is configured to insert into a receptacle-shaped connector, referred to as a female connector, in order for the two connectors to mate). However, it is understood that this is an example. In various implementations, the connector 209 may be configured as a female connector into which a male connector may be inserted.

Induction power transfer, such as discussed herein, may generate heat. Inductive power transfer from the power transfer component 205 to the wearable electronic device 101 may increase the temperature of the wearable electronic device 101, the power transfer component 205, and/or other components of the external power apparatus 103. The temperature increase may not be enough to damage components, but may result in discomfort for a user holding or wearing the wearable electronic device 101 during inductive power transfer. To limit potential discomfort and/or damage from temperature increase, control circuitry of the external power apparatus 103 (such as the control circuitry 417 shown in FIG. 4) may regulate the amount of power inductively transferred by the power transfer component 205 in a given time. By controlling the amount of power inductively transferred by the power transfer component 205 in a given time, temperature increase may be reduced, minimized, and/or eliminated. In various implementations, a thermal insulator may be positioned on the power transfer component 205 where the power transfer component 205 would contact a user when the wearable electronic device 101 is worn to reduce, minimize, or eliminate the user from perceiving a temperature increase.

In some cases, the control circuitry of the external power apparatus 103 may regulate the power inductively transferred by the power transfer component 205 in order to control temperature increases only when the wearable electronic device 101 is worn. The control circuitry of the external power apparatus 103 may detect that the wearable electronic device 101 is worn, or receive a notification that the wearable electronic device 101 is worn. In such cases, the control circuitry of the external power apparatus 103 may change the amount of power inductively transferred by the power transfer component 205 depending on whether or not the control circuitry of the external power apparatus 103 detects or receives notifications that the wearable electronic device 101 is worn.

For example, in some implementations, the external power apparatus 103 may include one or more sensors that detect a user's body. Such a sensor may be a pair of contact plates that are connected to a circuit and are exposed on a surface of the external power apparatus 103. When the wearable electronic device 101 is worn, the contact plates may contact the user's skin. Contact between the contact plates and the user's skin may complete the circuit. By monitoring for a completed circuit, the control circuitry of the external power apparatus 103 may detect that the wearable electronic device 101 is worn. In such an example, the control circuitry of the external power apparatus 103 may regulate the power inductively transferred by the power transfer component 205 when the circuit is completed.

By way of another example, the wearable electronic device 101 may include one or more sensors that detect a user's body. Such a sensor may be a photoplethysmographic sensor that emits light and receives any of that light that is absorbed and reflected back by the user's body. By analyzing data from the photoplethysmographic sensor regarding light received, the wearable electronic device 101 may determine that the wearable electronic device 101 is worn and may transmit a notification to the external power apparatus 103 (such as via Bluetooth and/or another communication media). In response to such a notification, the control circuitry of the external power apparatus 103 may regulate the power inductively transferred by the power transfer component 205.

By way of still another example, the wearable electronic device 101 may be communicably connected to a mechanism of the band 102 that the wearable electronic device 101 may use to determine when the band 102 is clasped. For example, the band 102 may include conductive plates positioned on ends of the band 102 that connect when clasped. A circuit of the wearable electronic device 101 may be electrically connected to the conductive plates. The wearable electronic device 101 may monitor the circuit and determine that the band 102 is clasped when the circuit completes. The wearable electronic device 101 may assume that the wearable electronic device 101 is worn when the band 102 is clasped and may transmit a notification accordingly to the external power apparatus 103. In response, the control circuitry of the external power apparatus 103 may regulate the power inductively transferred by the power transfer component 205.

In some implementations, the external power apparatus 103 may transmit data to and/or receive data from the wearable electronic device 101 in addition to providing power to the wearable electronic device 101. For example, the external power apparatus 103 may form a data connection between a smart phone and the wearable electronic device 101 via the connector 209 and the power transfer component 205. In such an example, the external power apparatus 103 may transfer data to and/or from the wearable electronic device 101 inductively via the power transfer component 205 and to and/or from the smart phone via the connector 209.

Figure 6A:
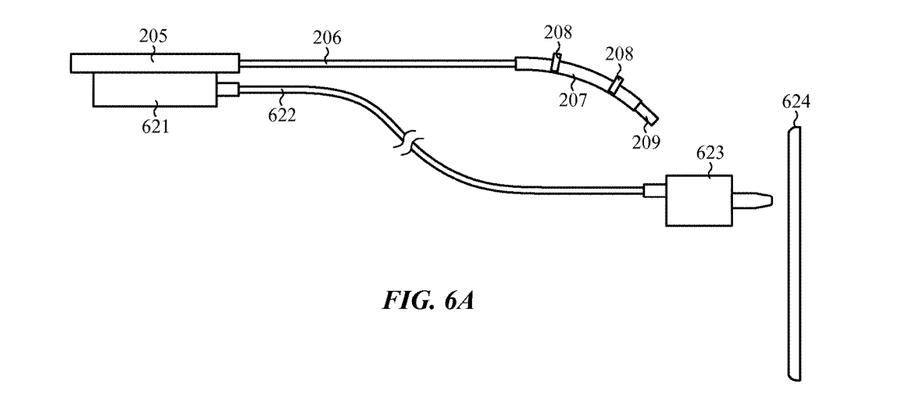
FIG. 6A depicts the external power apparatus of FIG. 1 coupled to a charging dock.
Figure 6B:
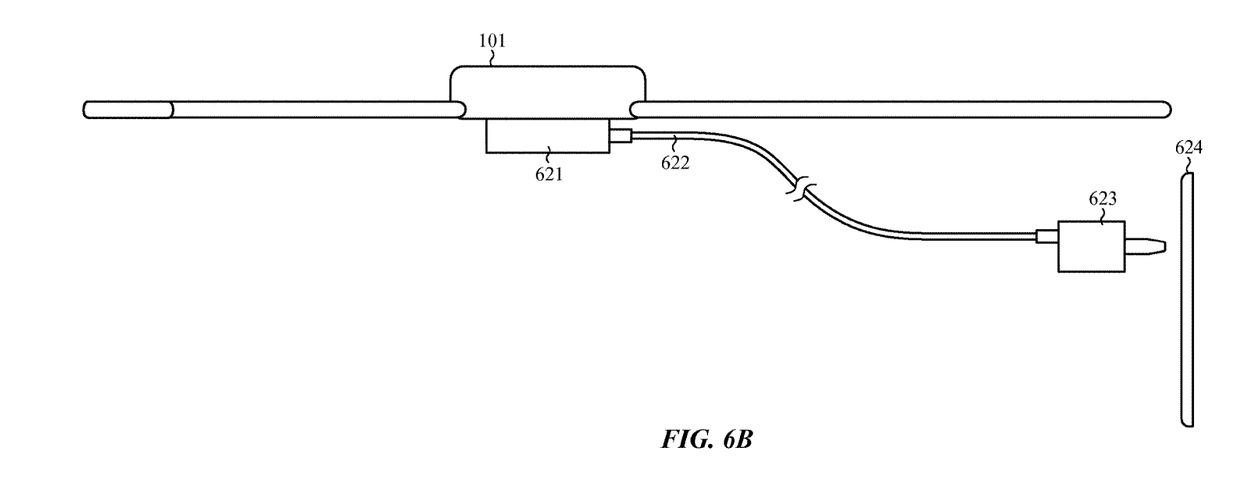
FIG. 6B depicts the wearable electronic device FIG. 1 coupled to the charging dock.

In various implementations, the power transfer component 205 may inductively receive power to charge the battery 207 or other storage components. For example, FIG. 6A illustrates the external power apparatus 103 coupled to a charging dock 621. The external power apparatus 103 may be receive power from the charging dock 621, which draws power from a wall outlet 624 via a cord 622 and plug 623. In some implementations of this example, the charging dock 621 may also be used to inductively provide power to the wearable electronic device 101. For example, FIG. 6B illustrates the wearable electronic device 101 coupled to the charging dock 621.

Although the external power apparatus 103 is illustrated and described with respect to FIGS. 1-4 above as external to the band 102 and attachable thereto, it is understood that this is an example. In various implementations, one or more portions of a power apparatus (such as the power transfer component 205, the inductive coil 411, the magnet 412, the conductor 206, the battery 207, the connector 209, and so on) may be components of a band or other attachment member without departing from the present disclosure.

In various implementations, the wearable electronic device 101 may include one or more transmitters and/or receivers that operate through the body of the wearable electronic device 101. Such transmitters and/or receivers may be light emitters and/or detectors, antennas (such as cellular antennas, WiFi antennas, Bluetooth antennas, and so on), sensors, and/or any other component that transmits and/or receives. In such implementations, one or more windows 104 may be formed in the body to accommodate such transmissions, such as optical windows that allow the passage of light to and/or from one or more light emitters and/or detectors. Further, in such implementations the power transfer component 205 may be configured to accommodate transmission to and/or from such windows 104 or areas so that such transmissions can occur while the power transfer component 205 is coupled to the surface.

Figure 7:
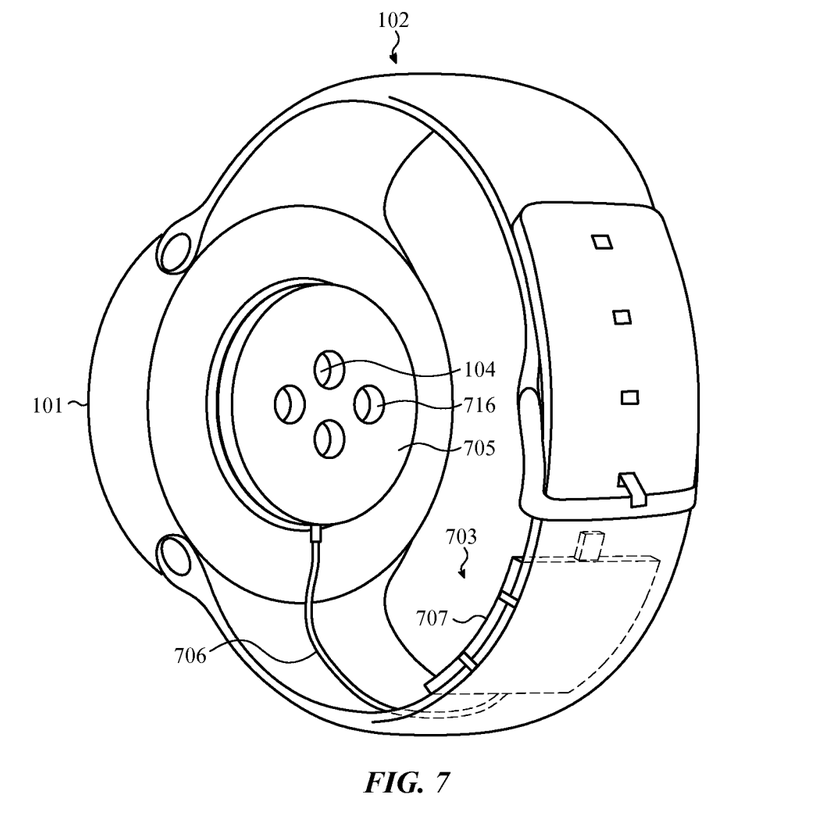
FIG. 7 depicts another implementation of an external power apparatus coupled to a wearable electronic device.

For example, FIG. 7 illustrates an implementation of the wearable electronic device 101 with the band 102 coupled to an external power apparatus 703 (having a power transfer component 705 coupled to a battery 707 or other storage component via a conductor 706) where the external power apparatus 703 defines apertures 716 to accommodate sensor windows 104. The apertures 716 may align with the sensor windows 104 when the power transfer component 705 is coupled to the body. In this way, light may be transmitted through the sensor windows 104 while the power transfer component 705 is coupled to the body.

Although FIG. 7 shows the power transfer component 705 as including apertures 716, it is understood that this is an example. As another example, sensor windows may be configured in the power transfer component 705 instead of utilizing apertures 716 without departing from the scope of the present disclosure. Such sensor windows may be formed of a material that allows transmissions to pass, such as optically translucent materials in examples where the transmissions are light transmissions.

Figures 8A, 8B:
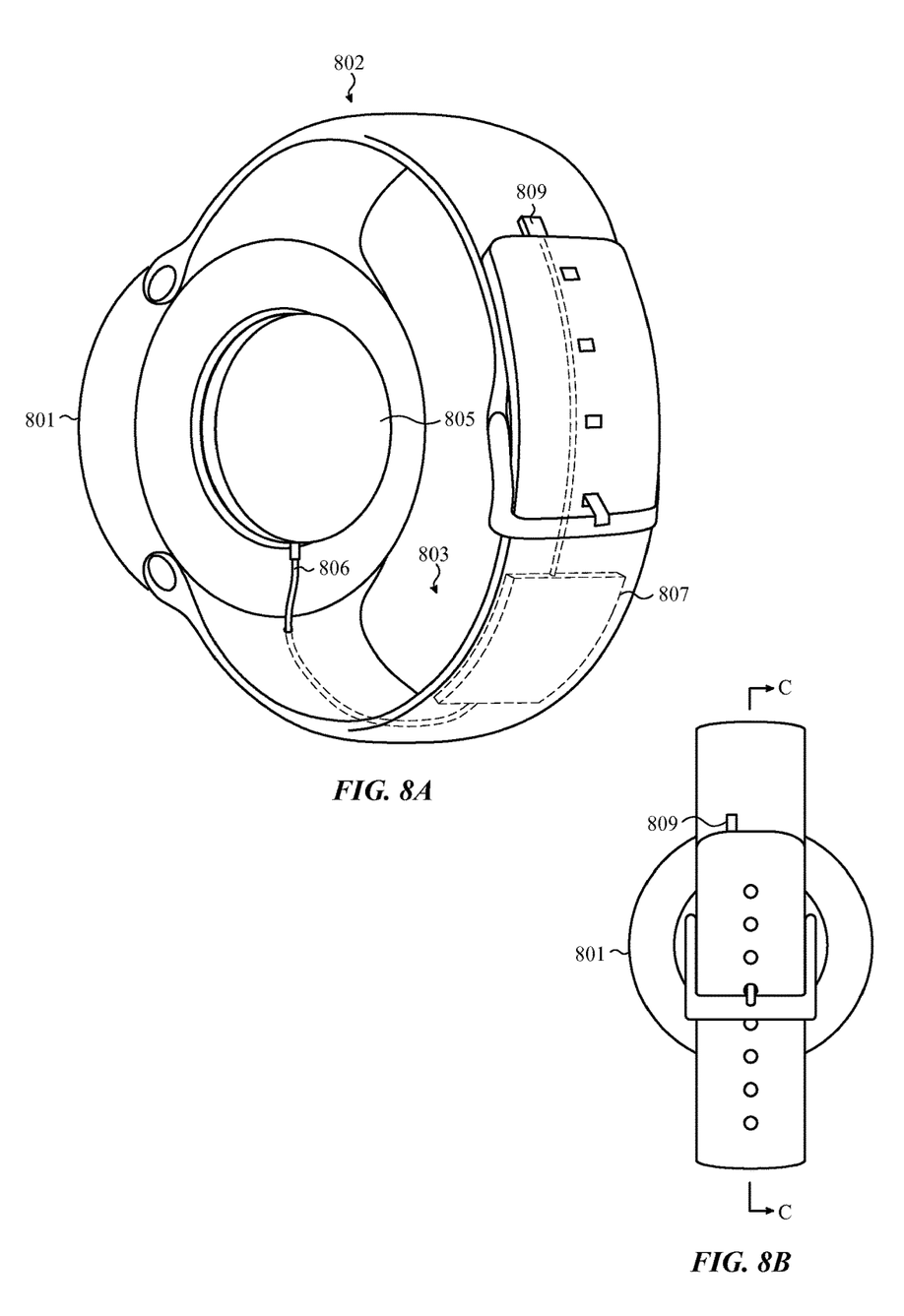
FIGS. 8A and 8B depict a wearable electronic device with a power apparatus integrated into the device's band.
Figure 9:
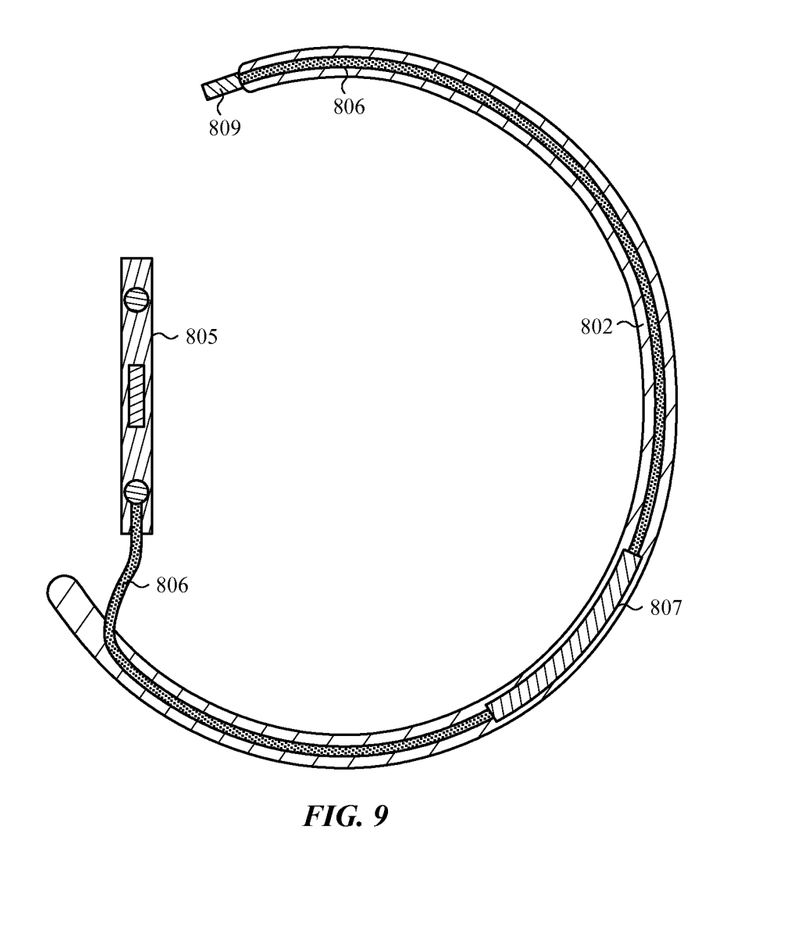
FIG. 9 depicts a cross-sectional view of the band of FIGS. 8A and 8B, taken along line C-C of FIG. 8B.

For example, FIGS. 8A and 8B depict a wearable electronic device 801 with a power apparatus integrated into the device's band 802. FIG. 9 is a cross-sectional view of the band 802 of FIGS. 8A and 8B, taken along line C-C of FIG. 8B. With reference to FIGS. 8A-9, the band 802 may include a power transfer component 805 that couples to a surface of the wearable electronic device 801, one or more conductors 806 that are at least partially embedded in the band 802, one or more batteries 807 or other storage components that are at least partially embedded in the band 802, and/or one or more connectors 809. The battery 807 may be electrically connected to the conductors 806, which may be electrically connected to the power transfer component 805 and the connector 809, respectively. As such, the battery 807 and the power transfer component 805 or the connector 809 may transmit power to each other via the conductor 806.

As illustrated, the connector 809 is shown projecting from an end of one of the portions of the band 802 such as to be exposed while the band 802 is worn. However, it is understood that this is an example. In various implementations, the connector 809 may project such that it is not exposed when the band 802 is worn or generally. In still other implementations, the connector 809 may project from a portion of the band 802 other than the end of one of the portions as shown. In still other implementations, the connector 809 may be fully or partially concealed within the band 802, either while the band 802 is worn or generally.

For example, in some implementations the connector 809 may be embedded in the end of the band 802 and may be configured to project out of the band 802 for use. In such a case, the connector 809 may be connected to a movement mechanism operable to cause the connector 809 to project out of the band 802, such as a slider positioned outside of the band 802 that connects to the connector 809 within the band 802 that is operable to move the connector 809 between a projected and a retracted position.

By way of another example, the connector 809 may be coupled to the band 802 on a hinge such that the connector 809 may be moved between an extended and a retracted position. The connector 809 may be articulated on the hinge from the retracted position to the extended position by rotating out from a cavity on the band 802 into which the connector 809 fits to project from the end of the band 802. The connector 809 may also be articulated on the hinge from the extended position to the retracted position by rotating back into the cavity on the band 802.

In some implementations, the battery 807 or other storage component may be a flexible battery (such as a flexible lithium polymer battery, a flexible lithium-ion battery, a battery with a flexible graphene based current collector, and so on). This may allow the battery 807 to bend or otherwise deform if the band 802 bends. In implementations such as those illustrated in FIGS. 8 and 9, where the battery 807 is at least partially embedded in the band 802, battery 807 flexibility may prevent a user from noticing the battery 807 because a portion of the band 802 resists bending. This may also prevent the battery 807 from making a portion of the band 802 unbendable or more difficult to bend.

Although the power transfer component 805 and the battery 807 are shown as components of the band 802, it is understood that this is an example. In various implementations, a band may include a conductor that is connectible to one or more power transfer components, inductive coils, and/or batteries without departing from the scope of the present disclosure.

Figure 10:
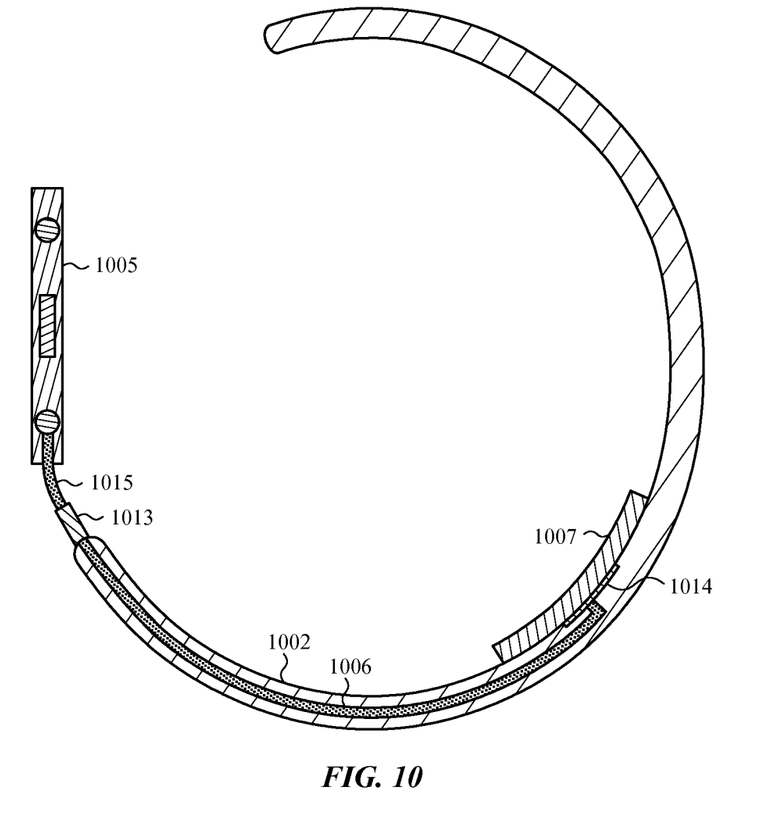
FIG. 10 depicts a cross-sectional view of another band having an integrated power source.

For example, FIG. 10 illustrates a cross-sectional view of another band 1002 having an integrated power source in accordance with further embodiments of the present disclosure. The band 1002 includes a conductor 1006 that is embedded at least partially within the band 1002. The band 1002 also includes a first connection interface 1013 and a second connection interface 1014 (which may be conductive clips, electrical connectors, pairs of contact pads, exposed portions of the conductor 1006, and/or any other electrical connection mechanism). The first connection interface 1013 may be connected to a first end or portion of the conductor 1006 and the second connection interface 1014 may be connected to a second end or portion of the conductor 1006. The first connection interface 1013 may be connectible to a power transfer component 1005 (such as via an additional conductor 1015) and the second connection interface 1014 may be connectible to a battery 1007 or other storage component.

Thus, the power transfer component 1005 and/or the battery 1007 may be releasably connectible to the band 1002 instead of being integral therewith. In this way, various power transfer components 1005, inductive coils, and/or batteries 1007 may be utilized with the band 1002 instead of utilizing incorporated components that cannot be swapped in and/or out.

For example, the power apparatus band 1002 may be utilized to charge the wearable electronic device 801 of FIGS. 8A and 8B until available power in the battery 1007 is depleted. The depleted battery 1007 may be disconnected from the second connection interface 1014 and an additional battery 1007 that has available power may be connected to the second connection interface 1014. In this way, the power apparatus band 1002 may be utilized to charge the wearable electronic device 801 of FIGS. 8A and 8B beyond the capacity of a single battery 1007.

Although the power apparatuses illustrated and described above with respect to FIGS. 1-10 are discussed in the context of interacting with a wearable electronic device, it is understood that these are examples. In various embodiments, such power apparatuses may be utilized with various electronic devices without departing from the scope of the present disclosure (whether wearable or not) such as desktop computing devices, laptop computing devices, tablet computing devices, cellular telephones, smart phones, mobile computing devices, digital media players, displays, printers, input/output devices, fitness monitors, and/or any other electronic device.

Further, although the power apparatuses illustrated and described above with respect to FIGS. 1-2 and 6-10 are illustrated as utilizing a single battery, it is understood that these are examples. In various embodiments, such power apparatuses may include multiple batteries without departing from the scope of the present disclosure. Such multiple batteries may be connected in serial, parallel, and/or a combination thereof. Various configurations are possible and contemplated.

Figure 11:
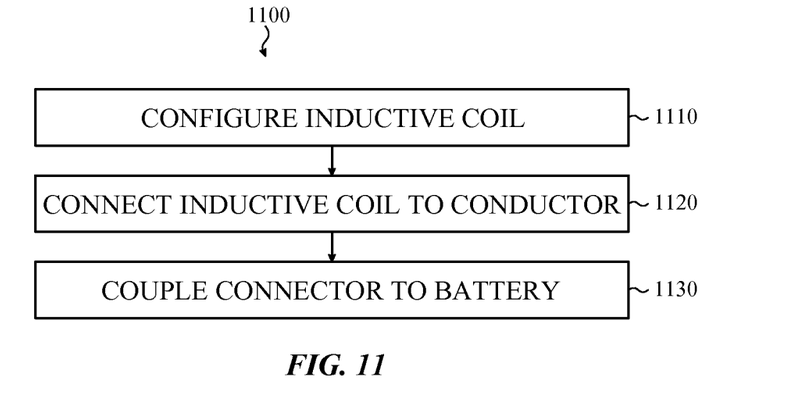
FIG. 11 depicts a flow chart illustrating a method for constructing a power apparatus. This method may construct any of the power apparatuses of FIGS. 1-2 and 7-10.

FIG. 11 is a flow chart illustrating a method 1100 for constructing a power apparatus. This method may construct any of the power apparatuses of FIGS. 1-2 and 7-10.

At 1110, an inductive coil may be configured. For example, an inductive coil may be positioned within a housing of a power transmission pad. The inductive coil may be positioned around one or more magnets within the housing. The inductive coil may be configured to couple to a wearable electronic device and/or inductively transmit power to and/or receive power from the wearable electronic device.

At 1120, the inductive coil may be connected to one or more conductors. In various implementations, the inductive coil and/or the conductor may be partially or fully embedded within a band of a wearable electronic device, configured to attach to such a band, and so on. The conductor may be a flexible conductor.

At 1130, the conductor may be coupled to one or more batteries or other storage components. In various implementations, the battery may be partially or fully embedded within a band of a wearable electronic device, configured to attach to such a band, and so on. The battery may be a flexible conductor. The battery may be one or more batteries connected in series, parallel, and/or a combination thereof.

Although the example method 1100 is illustrated and described as including particular operations performed in a particular order, it is understood that this is an example. In various implementations, various orders of the same, similar, and/or different operations may be performed without departing from the scope of the present disclosure.

For example, the example method 1100 is illustrated and described as configuring the inductive coil, coupling the inductive coil to a conductor, and coupling the conductor to a battery. However, it is understood that this is an example for the sake of clarity and that in various implementations performance of coupling, connecting, and/or configuring any of the components may be performed in any order without departing from the scope of the present disclosure.

As described above and illustrates in the accompanying figures, the present disclosure relates to wearable power apparatuses for wearable electronic devices. A wearable power apparatus for a wearable electronic device may include an inductive coil that attaches to the wearable electronic device and/or one or more batteries coupled to the inductive coil by one or more conductors. The inductive coil may inductively transmit power from the battery to the wearable electronic device. The power apparatus may be capable of providing power to the wearable electronic device while the wearable electronic device is worn. As the power apparatus is wearable, a user may use the power apparatus without removing (and/or while using) the wearable electronic device. The power apparatus may have attachment mechanisms or attachment components that attach to a band coupled to the wearable electronic device. Alternatively or additionally, the power apparatus may be at least partially embedded within the band. The inductive coil may also receive power for the battery from another inductive coil. The battery may include one or more connectors that provide power to (and/or receiving power from) one or more other electronic devices.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A wearable external power apparatus for a wearable electronic device, comprising:
    a housing including a magnet that magnetically attracts the housing to the wearable electronic device;
    an inductive coil disposed within the housing;
    one or more sensors configured to determine that the wearable electronic device is being worn by a user;
    control circuitry coupled to the inductive coil and disposed within the housing, the control circuitry configured to control temperature increase from wireless power transfer by regulating an amount of power inductively transferred by the inductive coil upon the determination by the one or more sensors that the wearable electronic device is being worn by the user;
    a conductor electrically connected to the inductive coil;
    a battery electrically connected to the conductor; and
    an attachment mechanism that attaches to the wearable electronic device or a band coupled to the wearable electronic device; wherein
    the inductive coil inductively transmits power from the battery to the wearable electronic device while the wearable external power apparatus is worn.

2. The wearable external power apparatus of claim 1, wherein the attachment mechanism comprises a clip that clips to the band.

3. The wearable external power apparatus of claim 1, wherein the attachment mechanism attaches to an inner surface of the band.

4. The wearable external power apparatus of claim 1, wherein the conductor is biased toward a straight, unbent position.

5. The wearable external power apparatus of claim 4, wherein the conductor is biased toward the band when the attachment mechanism is attached.

6. The wearable external power apparatus of claim 1, further comprising a connector coupled to the battery, the connector configured to charge the battery.

7. The wearable external power apparatus of claim 6, wherein the battery provides power to an electronic device via the connector.

8. The wearable external power apparatus of claim 1, the housing defining an aperture aligned with a sensor window of the wearable electronic device when the housing magnetically attaches to the wearable electronic device.

9. A wearable electronic device, comprising:
    a body including a first inductive coil;
    a band that couples the body to a wearer;
    a conductor embedded at least partially within the band;
    a battery embedded at least partially within the band and electrically connected to the conductor; and
    a second inductive coil disposed within a housing, the second inductive coil is electrically connected to the conductor and magnetically attachable to the body;
    one or more sensors configured to determine that the wearable electronic device is being worn by a user;
    control circuitry coupled to the second inductive coil and disposed within the housing, the control circuitry configured to control temperature increase from wireless power transfer by regulating an amount of power inductively transferred by the inductive coil upon the determination by the one or more sensors that the wearable electronic device is being worn by the user;
    wherein the second inductive coil inductively transmits power from the battery to the first inductive coil.

10. The wearable power apparatus of claim 9, wherein the second inductive coil draws power from the battery through the conductor.

11. The wearable power apparatus of claim 9, wherein the battery is flexible.

12. The wearable power apparatus of claim 9, further comprising:
    a power connector coupled to the battery and at least partially concealed within the band while the wearable power apparatus is worn.

13. The wearable power apparatus of claim 9, wherein the battery is curved to conform to a curvature of the band.

14. The wearable power apparatus of claim 9, wherein the conductor is curved to conform to a curvature of the band.

15. The wearable power apparatus of claim 9, wherein the conductor is flexible.

16. A wearable power apparatus, comprising:
    a housing;
    a storage component;
    an attachment component operable to couple the storage component to a band of a wearable electronic device;

one or more sensors configured to determine that the wearable electronic device is being worn by a user;

a power transfer component disposed within the housing and operative to:
  magnetically attach to the wearable electronic device; and
  inductively transmit power drawn from the storage component to the wearable electronic device while the wearable power apparatus and wearable electronic device are worn; and circuitry disposed within the housing, connected to the power transfer component, operative to control temperature increase from wireless power transfer by regulating an amount of power inductively transferred by the inductive coil upon the determination by the one or more sensors that the wearable electronic device is being worn by the user.

17. The wearable power apparatus of claim 16, wherein the attachment component is operable to couple the storage component to the band such that the band at least partly obscures the storage component from view while the wearable external power apparatus and wearable electronic device are worn.

18. The wearable power apparatus of claim 16, wherein the circuitry is operable to control the power transfer component to regulate inductive transmission of power differently when the wearable electronic device is worn than when the wearable electronic device is unworn.

19. The wearable power apparatus of claim 16, wherein the wearable power apparatus is operable to exchange data between the wearable electronic device and another electronic device.

* * * * *